United States Patent Office 3,514,504
Patented May 26, 1970

---

3,514,504
CYCLOPROPYLMETHYL PHOSPHATE AND PHOSPHONATE ESTERS
Gerald H. Peterson, 1326 S. Armacost Ave.,
West Los Angeles, Calif. 90025
No Drawing. Filed June 16, 1967, Ser. No. 646,473
Int. Cl. C07f 9/08, 9/38; C09k 3/00
U.S. Cl. 260—958                                      13 Claims

ABSTRACT OF THE DISCLOSURE

This invention relates to chemical compounds which are phosphate esters and phosphonate esters having three organic radicals at least one of which is the cyclopropylmethyl radical and the other organic radicals of which are the cyclopropylmethyl radical, the phenyl radical, or the tolyl radical.

These chemical compounds are useful for thermally stable fire resistant hydraulic fluids, especially for aircraft, either alone or admixed with other additives.

---

This invention relates to new chemical compounds which are phosphate esters and phosphonate esters having three organic radicals at least one of which is the cyclopropylmethyl radical and the other organic radicals of which are the cyclopropylmethyl radical, the phenyl radical, or the tolyl radical.

These new chemical compounds are useful for thermally stable fire resistant hydraulic fluids, especially for aircraft, either alone or admixed with other additives.

These compounds particularly include the following:

(1) Phosphate esters

Tri-cyclopropylmethyl phosphate
Di-cyclopropylmethyl phenyl phosphate
Mono-cyclopropylmethyl di-phenyl phosphate
Di-cyclopropylmethyl tolyl phosphate
Mono-cyclopropylmethyl di-tolyl phenyl phosphate
Mono-cyclopropylmethyl tolyl phenyl phosphate (2) Phosphonate esters Di-cyclopropylmethyl cyclopropylmethane phosphonate
Di-cyclopropylmethyl benzene phosphonate
Di-phenyl cyclopropylmethane phosphonate
Di-cyclopropylmethyl toluene phosphonate
Di-tolyl cyclopropylmethane phosphonate
Mono-cyclopropylmethyl tolyl benzene phosphonate
Mono-cyclopropylmethyl phenyl toluene phosphonate The cyclopropylmethyl radical is shown as follows:

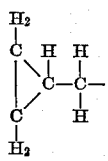

Each of these new foregoing chemical compounds can be made by the same methods used for making the corresponding phosphates and phosphonates where the propyl radical is used instead of the cyclopropylmethyl radical. The methods of making the corresponding phosphates and phosphonates with propyl radical are known to those skilled in the art, and with the disclosure herein those skilled in the art to which my invention appertains will be able to make and use the new chemical compounds of my invention.

The preparation of the known phosphate esters and phosphonate esters having the propyl radical instead of the cyclopropylmethyl radical of my invention is disclosed in the books entitled "Introduction to Hydraulic fluids" by Roger E. Hatton, published by Reinhold Publishing Corporation, "Organo-Phosphorous Compounds" by G. M. Kosolopoff, published by John Wiley and Sons, "Synthetic Lubricants" edited by Reigh C. Gunderson and Andrew W. Hart, published by Reinhold Publishing Corporation, New York, and numerous other publications and issued patents. The particular relevant disclosure in the book entitled "Introduction to Hydraulic Fluids" appears on pages 190 through 195, and the particular relevant disclosure in the book entitled "Synthetic Lubricants" appear on pages 103 through 150.

Even though those skilled in the art will be able to prepare and use the new chemical compounds of my invention, there is given below examples of these compounds and their preparation.

EXAMPLE 1

Tri-cyclopropylmethyl phosphate 3.5 mols of cyclopropylmethyl alcohol are added dropwise with stirring to 1 mol of phosphorus oxychloride ($POCl_3$) at 25–35° C. The temperature is slowly brought up to about 65° C. and the pressure is slowly reduced to 50 mm./Hg with stirring to remove hydrogen chloride. The mixture is then distilled and tri-cyclopropylmethyl phosphate is collected.

EXAMPLE 2

Tri-cyclopropylmethyl phosphate

To 5 mols of cyclopropylmethanol, 3 mols of freshly cut metallic sodium are added in small cubes about ¼" with stirring and maintaining the temperature between 25 and 40° C. When reaction is complete as evidenced by cessation of bubbling, 1 mol of phosphorus oxychloride ($POCl_3$) is added dropwise with stirring while maintaining the temperature of about 25–50° C. The reaction mixture is filtered to remove the precipitated sodium chloride and the filtrate is distilled and tri-cyclopropylmethyl phosphate is collected.

EXAMPLE 3

Di-cyclopropylmethyl phenyl phosphate 2 mols of cyclopropylmethanol are added dropwise with stirring to 1 mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The resulting mixture is washed, dried and distilled to separate out the desired water insoluble di-cyclopropylmethyl phenyl phosphate.

EXAMPLE 4

Di-cyclopropylmethyl tolyl phosphate 2 mols of cyclopropylmethanol are added dropwise with stirring to 1 mol of $POCl_3$ at 25–35° C. The temperature is slowly brought up to about 65° C. and the pressure slowly reduced to 50 mm./Hg. to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble di-cyclopropylmethyl tolyl phosphate.

EXAMPLE 5

Mono-cyclopropylmethyl di-phenyl phosphate 1 mol of cyclopropylmethanol is added dropwise with stirring to 1 mol of POCl$_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of phenol in 2 mols of NaOH with good stirring. The mixture is allowed to rise in temperature to 25° C. with continued stirring. The resulting mixture is washed, dried and distilled to separate out the desired water insoluble mono-cyclopropylmethyl di-phenyl phosphate.

EXAMPLE 6

Mono-cyclopropylmethyl para-tolyl phosphate 1 mol of cyclopropylmethanol is added dropwise with stirring to 1 mol of POCl$_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of para-cresol in 2 mols of NaOH with good stirring. The mixture is allowed to rise in temperature to 25° C. with continued stirring. The resulting mixture is washed, dried and distilled to separate out the desired water insoluble mono-cyclopropylmethyl para-tolyl phospate.

EXAMPLE 7

Mono-cyclopropylmethyl phenyl tolyl phosphate 1 mol of cyclopropylmethanol is added dropwise with stirring to 1 mol of POCl$_3$ at 25–35° C. The tempearture is slowly brought up to about 65° C. and the pressure slowly reduced to 50 mm./Hg to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The mixture is filtered and the filtrate is added dropwise, without further purification, at 0–5° C. to a saturated solution of 1 mol of mett-cresol in 1 mol of NaOH with good stirring. The mixture is allowed to rise in temperature with continued stirring. The resulting mixture is washed, dried and distilled to separate out the desired water insoluble mono-cyclopropylmethyl phenyl meta-tolyl phosphate.

EXAMPLE 8

Di-cyclopropylmethyl cyclopropylmethane phosphonate 3 mols of cyclopropylmethanol are added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclopropylmethyl cyclopropylmethane phosphonate is collected.

EXAMPLE 9

Di-phenyl cyclopropylmethane phosphonate 3 mols of phenol are added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. The mixture is then distilled and di-phenyl cyclopropylmethane phosphonate is collected.

EXAMPLE 10

Di-meta-tolyl cyclopropylmethane phosphonate 3 mols of meta-cresol are added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. The mixture is then distilled and di-meta-tolyl cyclopropylmethane phosphonate is collected.

EXAMPLE 11

Cyclopropylmethyl meta-tolyl cyclopropylmethane phosphonate 1 mol of cyclopropylmethanol is added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise to 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble cyclopropylmethyl meta-tolyl cyclopropylmethane phosphonate.

EXAMPLE 12

Cyclopropylmethyl phenyl cyclopropylmethane phosphonate 1 mol of cyclopropylmethanol is added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The resulting mixture is washed, dried and distilled to separate out the desired water insoluble cyclopropylmethyl phenyl cyclopropylmethane phosphonate.

EXAMPLE 13

Di-cyclopropylmethyl benzene phosphonate 3 mols of cyclopropylmethanol are added dropwise with stirring to 1 mol of benzene phenyl phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclopropylmethyl benzene phosphonate is collected.

EXAMPLE 14

Di-cyclopropylmethyl toluene phosphonate 3 mols of cyclopropylmethanol are added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclopropylmethyl toluene phosphonate is collected.

EXAMPLE 15

Cyclopropylmethyl phenyl benzene phosphonate

A mol of cyclopropylmethanol is added dropwise with stirring to 1 mol of benzene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0.5° C. to a saturated solution of 1 mol of phenol in 1 mol of sodium hydroxide with good stirring. The mixture is allowed to rise in temperature to 25° C. with continued stirring. The mixture is washed, dried and distilled and cyclopropylmethyl phenyl benzene phosphonate is collected.

EXAMPLE 16

Cyclopropylmethyl meta-tolyl benzene phosphonate 1 mol of cyclopropylmethanol is added dropwise with stirring to 1 mol of benzene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The mixture is washed, dried and distilled and cyclopropylmethyl meta-tolyl benzene phosphonate is collected.

EXAMPLE 17

Cyclopropylmethyl tolyl toluene phosphonate 1 mol of cyclopropylmethanol is added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. This mixture is allowed to rise in temperature to 25° C. with continued stirring. The mixture is washed, dried and distilled and cyclopropylmethyl tolyl toluene phosphonate is collected.

EXAMPLE 18

Cyclopropylmethyl phenyl toluene phosphonate 1 mol of cyclopropylmethanol is added dropwise with stirring to 1 mol of metal-toluene phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol of sodium hydroxide with good stirring. This mixture is allowed to rise in temperature to 25° C. with continued stirring. The mixture is washed, dried, and distilled and cyclopropylmethyl phenyl toluene phosphonate is collected.

EXAMPLE 19

Tolylphenyl cyclopropylmethane phosphonate 1 mol of meta-cresol is added dropwise with stirring to 1 mol of cyclopropylmethane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol sodium hydroxide with good stirring. This mixture is allowed to rise in temperature to 25° C. with continued stirring. The mixture is washed, dried and distilled and tolyl phenyl cyclopropylmethane phosphonate is collected.

The compositions of my invention have high thermal stability apparently due to the presence of the cyclopropylmethyl radical, high fire resistance, good lubricity, especially hydrodynamic lubricity, good boundary lubrication and good anti-wear, have ability to lubricate moving parts, particularly steel on steel, good viscosity and viscosity-temperature properties, and are readily admixed with many additives.

I claim:

1. The phosphate and phosphonate esters represented by the formula $(R_1R_2R_3)O_2O_xPO$ in which $x$ may be one or zero, $R_1$ is cyclopropylmethyl, and $R_2$ and $R_3$ are cyclopropylmethyl, phenyl, or tolyl.

2. The chemical compound as defined in claim 1 which is tri-cyclopropylmethyl phosphate.

3. The chemical compound as defined in claim 1 which is di-cyclopropylmethyl cyclopropylmethane phosphonate.

4. The chemical compound as defined in claim 1 which is di-cyclopropylmethyl benzene phosphonate.

5. The chemical compound as defined in claim 1 which is di-cycloypropylmethyl benzene phosphonate.

6. The chemical compound as defined in claim 1 which is di-cyclopropylmethyl tolyl phosphonate.

7. The chemical compound as defined in claim 1 which is mono-cyclopropylmethyl di-phenyl phosphate.

8. The chemical compound as defined in claim 1 which is mono-cyclopropylmethyl phenyl benzene phosphonate.

9. The chemical compound as defined in claim 1 which is mono-cyclopropylmethyl di-tolyl phosphate.

10. The chemical compound as defined in claim 1 which is mono-cyclopropylmethyl tolyl toluene phosphonate.

11. The chemical compound as defined in claim 1 which is mono-cyclopropylmethyl tolyl phenyl phosphate.

12. The chemical compound as defined in claim 1 which is mono-cyclopropylmethyl tolyl benzene phosphonate.

13. The chemical compound as defined in claim 1 which is mono-cyclopropylmethyl phenyl toluene phosphonate.

References Cited

UNITED STATES PATENTS

| | | | |
|---|---|---|---|
| 1,959,228 | 5/1934 | Blagden et al. | 260—958 XR |
| 2,682,522 | 6/1954 | Coover et al. | 260—958 XR |

CHARLES B. PARKER, Primary Examiner

A. H. SUTTO, Assistant Examiner

U.S. Cl. X.R.

260—973, 974; 252—78